United States Patent Office 2,829,947
Patented Apr. 8, 1958

2,829,947
METHOD FOR THE SEPARATION OF NIOBIUM AND TANTALUM

Harald Schaefer, Munster, Westphalia, and Margot Jori, Stuttgart, Germany, assignors to W. C. Heraeus G. m. b. H., Hanau (Main), Germany No Drawing. Application November 13, 1953
Serial No. 392,054

Claims priority, application Germany November 17, 1952

2 Claims. (Cl. 23—23)

The elements niobium and tantalum generally are found in the form of mixtures of their compounds which in many cases include composite or mixed crystals, and the present invention has for an object to provide a new and improved method for separating such mixtures to obtain at least one of these elements in a higher relative concentration.

It has been known that niobium pentoxide is reduced by hydrogen at a temperature of, for example, 900° C., to niobium dioxide, while tantalum pentoxide will remain completely unchanged under the same conditions. Recently information has also become available about the behaviour, during the reduction, of the $(Nb, Ta)_2O_5$ mixed crystals which in practice are always present, to the effect that these mixed pentoxide crystals are, by this reduction, rendered poorer in niobium, and that besides this a mixed dioxide phase is produced which is rich in niobium and poor in tantalum.

It is therefore possible to achieve separation of the elements niobium and tantalum by separating, subsequently to the reduction, the dioxide phase from the pentoxide phase. With this object in view it has already been proposed to transform the dioxide by reaction with chlorine at an elevated temperature according to the formula $$5MO_2 + 5/2Cl_2 = MCl_5(gas) + 2M_2O_5. \quad (M=Nb, Ta)$$

It will be observed that in this manner only one fifth of the niobium, mixed with greater or smaller quantity of tantalum, is separated out as a volatile chloride in each operation. Nevertheless, by frequent repetition of the reduction and chlorination operations, a technically useful separating effect will be obtained.

The present invention has more specifically for an object to make the separation or concentration of niobium and tantalum more economical by utilising the different behaviour of the pentoxides of niobium and tantalum respectively during the reduction to form dioxides or tetroxides. The reduction products are crystals whose chemical formula may be arbitrarily designated as either $NbO_2$ and $TaO_2$ (dioxides) or $Nb_2O_4$ and $Ta_2O_4$ (tetroxides), the first formulation corresponding to the stoichiometric conditions and the latter constituting simply a doubling of the first formula. Both represent the same oxide phase.

We have succeeded in attaining this object in a simple manner on the bases of the surprising discovery that out of the mixture of dioxides and pentoxides of niobium and tantalum and dioxide phase can be dissolved. We have discovered the unexpected fact that niobium dioxide, which hitherto has been known to be extremely inert to reactions, can be dissolved in hot strong sulphuric acid or in hot concentrated phosphoric acid. In this manner it is possible to separate in a single operation the whole of the dioxide phase from the pentoxide phase, the latter remaining undissolved.

The invention will now be explained with reference to an example as applied to the isolation of tantalum pentoxide poor in niobium from $(Nb, Ta)_2O_5$ mixtures and to various modifications of the said example.

*Example.*—The pentoxides of niobium and tantalum are reduced at 1000° C. with hydrogen of atmospheric pressure which has been dried to a residual partial pressure of aqueous vapour of only 0.04 millimetre until the weight becomes constant. When the reduction is completed, the oxygen loss amounts to approximately 7% in relation to the introduced $Nb_2O_5$ content. The deep black pulverulent reaction product is treated for an hour at 200° C. with sulphuric acid having a concentration of 80% by weight. As a result the dioxide phase will be practically completely dissolved while the pentoxide phase, which is of a light grey colour, remains undissolved. The undissolved phase is filtered off, and from the sulphuric filtrate the earth metal acid is precipitated in a manner known per se.

The results are shown in the following table, in which the percentage contents are indicated for $Nb_2O_5$, the remainder, supplementing it to 100%, being in each case constituted by $Ta_2O_5$.

| Starting substance, percent $Nb_2O_5$ | Residue, percent $Nb_2O_5$ | Filtrate, percent $Nb_2O_5$ |
|---|---|---|
| 51.3 | 6.0 | 83.0 |
| 20.2 | 3.7 | 85.5 |
| 42.5 | 7.3 | 84.6 |

The method of this example may be varied in a number of ways without exceeding the scope of our invention. Thus the reduction of the above mentioned pentoxides, which in the said example, is carried out with hydrogen, may alternatively be carried out with other reducing agents, for example with carbon monoxide, which may, if desired, be used in the form of a mixture with carbon dioxide. But according as the reduction is carried out more or less intensely, it may be so conducted that in the one case a pentoxide phase poor in niobium is produced and in the other case a dioxide phase poor in tantalum.

When carrying out the reduction with hydrogen, the known per se phenomenon may thus be exploited that the niobium/tantalum ratio in the pentoxide phase and in the dioxide phase depends upon the water vapour content of the hydrogen present in the reduction chamber. It is thus possible to control, within certain limits, the composition of the end product by varying the aqueous-vapour hydrogen ratio. When hydrogen having a low water-vapour content is employed, there is produced an $(Nb, Ta)_2O_5$ phase poor in niobium and a $(Nb, Ta)O_2$ phase containing a comparatively high proportion of $TaO_2$, e. g. 20% $TaO_2$. When on the contrary it is desired to obtain a dioxide phase relatively poor in tantalum, "humid" hydrogen having a high water-vapour content will have to be employed; in this case, however, more niobium will remain in the pentoxide phase.

The means employed for dissolving the dioxide phase may also be varied. Thus, for example, the extraction of the reaction product with phosphoric acid or with a mixture of selenium oxychloride and sulphuric acid leads to the same result as the above described treatment with sulphuric acid.

We claim:

1. In a process of separating niobium from tantalum present in a starting material containing the pentoxides of said metals, by reducing the starting material by means of a reducing agent selected from the group consisting of hydrogen and carbon monoxide in an amount insufficient to cause reduction to the metallic state but sufficient to reduce the major part of the niobium pentoxide present in the starting material to niobium dioxide while the major part of the tantalum pentoxide remains in the unreduced state as tantalum pentoxide, the step of extracting the resulting partly reduced starting material with concentrated sulfuric acid at about 200° C. until substantially all the dioxide content present in said partly reduced starting material is dissolved, separating, by filtration, the resulting solution from the undissolved residue containing the major part of the tantalum pentoxide present in the starting material, and precipitating a product of a high niobium content from the resulting acid solution.

2. In a process of separating niobium from tantalum present in a starting material containing the pentoxides of said metals, by reducing the starting material by means of a reducing agent selected from the group consisting of hydrogen and carbon monoxide in an amount insufficient to cause reduction to the metallic state but sufficient to reduce the major part of the niobium pentoxide present in the starting material to niobium dioxide while the major part of the tantalum pentoxide remains in the unreduced state as tantalum pentoxide, the step of extracting the resulting partly reduced starting material with about 80% by weight sulfuric acid at about 200° C. until substantially all the dioxide content present in said partly reduced starting material is dissolved, separating, by filtration, the resulting solution from the undissolved residue containing the major part of the tantalum pentoxide present in the starting material, and precipitating a product of a high niobium content from the resulting acid solution.

References Cited in the file of this patent

UNITED STATES PATENTS 2,537,316    Oppegaard _____ Jan. 9, 1951

FOREIGN PATENTS 108,051    Australia _____ Aug. 3, 1939
470,023    Canada _____ Dec. 12, 1950
467,484    Great Britain _____ June 14, 1937

OTHER REFERENCES

Mellor: "Comprehensive Treatise on Inorganic and Theoretical Chemistry," vol. 9, pages 856, 857 and 897.